(12) United States Patent
Nabetani

(10) Patent No.: US 7,669,575 B2
(45) Date of Patent: Mar. 2, 2010

(54) COUNTERBALANCING SHAFT ACCOMMODATING STRUCTURE

(75) Inventor: Shigeki Nabetani, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 43 days.

(21) Appl. No.: 12/143,240

(22) Filed: Jun. 20, 2008

(65) Prior Publication Data

US 2009/0032783 A1    Feb. 5, 2009

(30) Foreign Application Priority Data

Jul. 30, 2007    (JP)   ............................ P2007-197945

(51) Int. Cl.
     *F02B 75/06*    (2006.01)
(52) U.S. Cl. ...................................... 123/192.2; 74/603
(58) Field of Classification Search .............. 123/192.2; 74/603
See application file for complete search history.

(56) References Cited

U.S. PATENT DOCUMENTS 4,703,725 A    11/1987    Weertman 5,875,753 A    3/1999    Ishikawa
6,708,663 B1    3/2004    Stuckler

FOREIGN PATENT DOCUMENTS

| DE | 19947271 A1 | 4/2000 |
|---|---|---|
| EP | 0789166 A1 | 8/1997 |
| EP | 1 498 593 A2 | 1/2005 |
| JP | 10-238595 A | 9/1998 |
| JP | 2000-104789 A | 4/2000 |
| JP | 2001-295890 A | 10/2001 |
| JP | 2005-36872 A | 2/2005 |
| JP | 2006-105402 A | 4/2006 |
| JP | 2007-023902 A | 2/2007 |
| RU | 2 140 025 C1 | 10/1999 |

*Primary Examiner*—Noah Kamen
(74) *Attorney, Agent, or Firm*—Birch, Stewart, Kolasch & Birch, LLP

(57) ABSTRACT

A counterbalancing shaft accommodating structure includes: a pair of counterbalancing shafts, provided in an oil pan attached to a lower end portion of an engine; and a housing, adapted to accommodate the counterbalancing shafts in the oil pan. An upper end portion of the housing is provided further upwards than the lower end portion of the engine. An opening is formed continuously to expand over both rotational axes of the pair of counterbalancing shafts in an upper surface of the housing.

7 Claims, 5 Drawing Sheets

COUNTERBALANCING SHAFT ACCOMMODATING STRUCTURE

BACKGROUND OF THE INVENTION

The present invention relates to a counterbalancing shaft accommodating structure which is suitable for use in a motor vehicle engine.

There has been known a technique which uses counterbalancing shafts as one of techniques for absorbing vibrations of a reciprocating engine (hereinafter, referred to simply as an engine).

In addition, there has also been known a structure in which the counterbalancing shafts are provided within an oil pan which is provided on a lower side of the engine, and a structure like this is disclosed in JP-A-2005-36872 below.

However, when the counterbalancing shafts are provided within the oil pan, there occurs a situation in which the counterbalancing shafts stir oil within the oil pan. As this occurs, there may appear a situation in which a phenomenon is caused in which air bubbles are generated in oil (so-called aeration) or a loss of drive torque of the engine is caused.

Incidentally, in the technique in JP-A-2005-36872, as is shown in FIG. 4 of the same document, a structure is disclosed in which balance shafts (counterbalancing shafts) (44, 45) are accommodated within an upper housing (42) and a lower housing (43).

A plurality of openings (to which no reference numeral is imparted) are formed in the upper and lower housings (42, 43) in the technique of JP-A-2005-36872. Namely, it is not that the upper and lower housing (42, 43) are sealed hermetically.

Because of this, in the technique of JP-A-2005-36872, even though the balance shafts (44, 45) are accommodated within the upper and lower housings (42, 43), oil flows into the interior of the upper and lower housings (42, 43), and the oil continues to be stirred by the balance shafts (44, 45), leading to a problem that the aeration of the oil or the torque loss is caused.

In addition, in general, the use of counterbalancing shafts increases the size of an engine. Note that in the technique of JP-A-2005-36872, although the engine is considered to be made small in size to some extent by providing the balance shafts (44, 45) within the oil pan, there are still demands for smaller engines.

SUMMARY

It is therefore an object of the invention to provide a counterbalancing shaft accommodating structure which can contribute to realizing a small engine while suppressing the occurrence of oil aeration and torque loss.

In order to achieve the object, according to the invention, there is provided a counterbalancing shaft accommodating structure, comprising:

a pair of counterbalancing shafts, provided in an oil pan attached to a lower end portion of an engine; and a housing, adapted to accommodate the counterbalancing shafts in the oil pan, wherein an upper end portion of the housing is provided further upwards than the lower end portion of the engine, and an opening is formed continuously to expand over both rotational axes of the pair of counterbalancing shafts in an upper surface of the housing.

Edge portions of the opening may be substantially equal in height to upper ends of outermost rotational loci of the counterbalancing shafts.

Edge portions of the opening may be offset further inwards towards a center of the housing than side edge portions of the housing, respectively.

The housing may have side wall portions which are formed curvedly in such a manner as to follow outermost rotational loci of the counterbalancing shafts.

The counterbalancing shaft accommodating structure may further include a journal portion that extends in a direction, which intersects both the rotational axes of the counterbalancing shafts at right angles, in the housing, and that supports rotatably the counterbalancing shafts. The opening may be partitioned into at least two areas by the journal portion.

DETAILED DESCRIPTION OF PREFERRED EMBODIMENTS

Hereinafter, a counterbalancing shaft accommodating structure according to an embodiment of the invention will be described based on the drawings.

Figure 1:
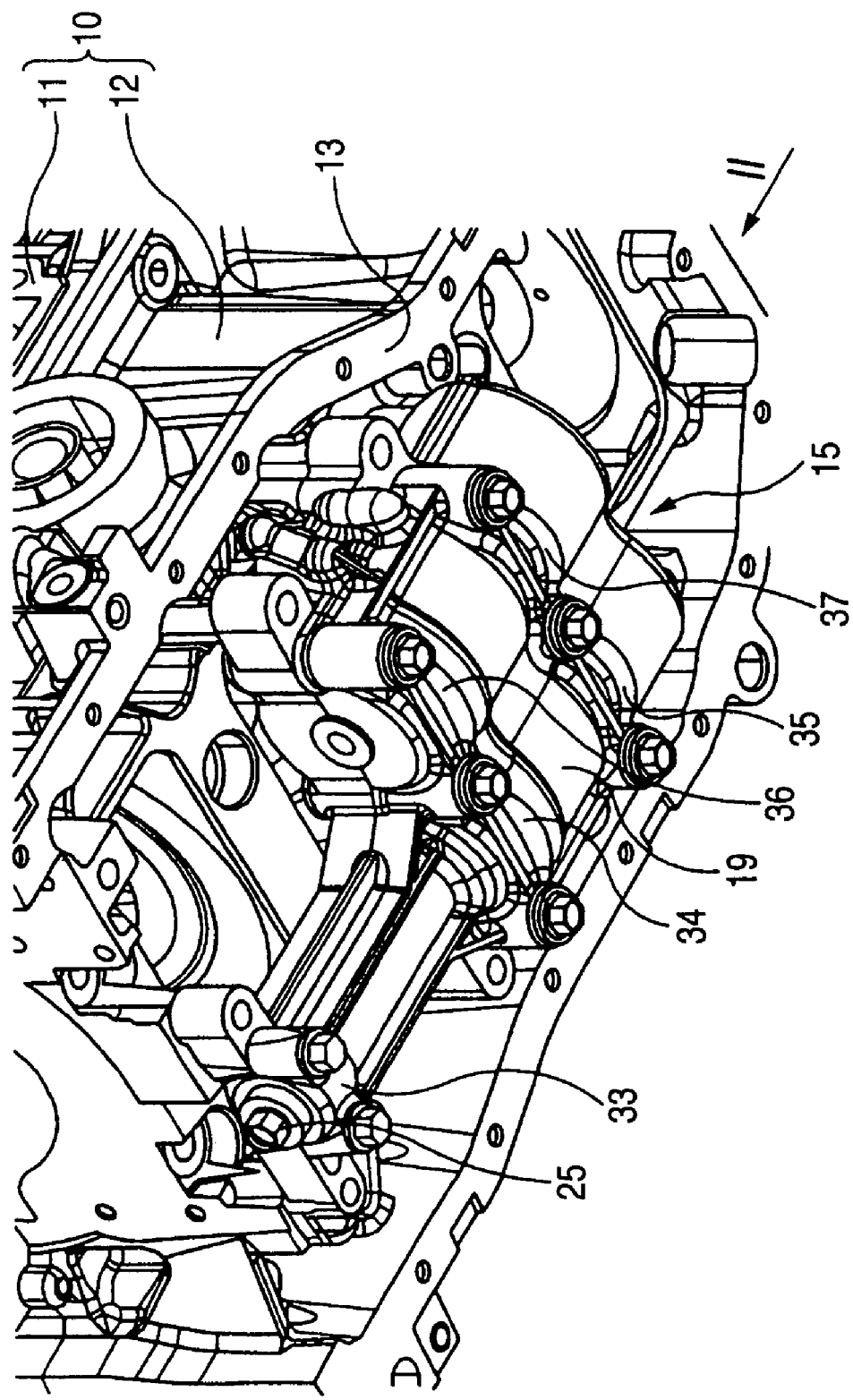
FIG. 1 is an exemplary perspective view as downwardly viewed which shows an overall configuration of a counterbalancing shaft accommodating structure according to an embodiment of the invention.
Figure 2:
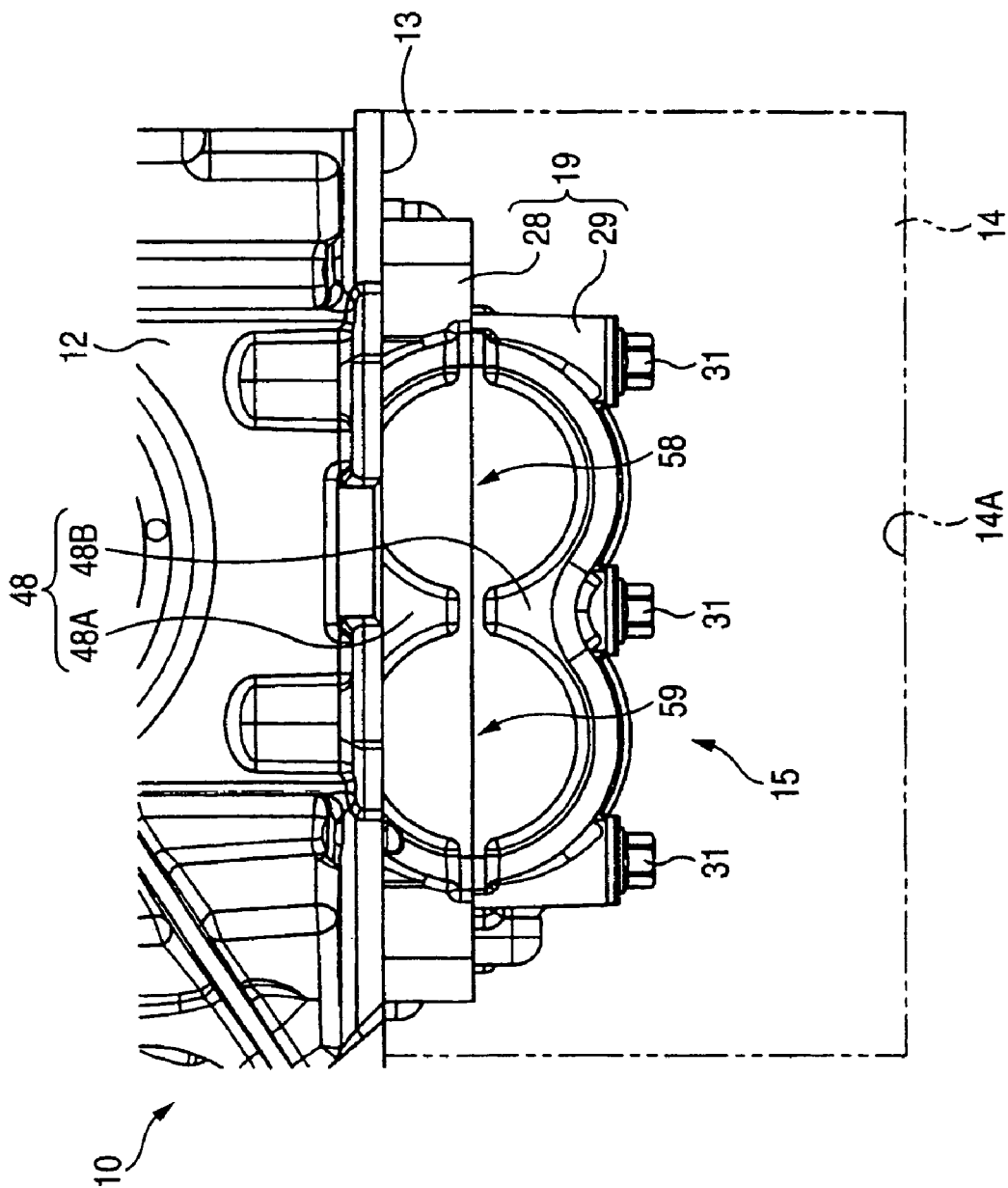
FIG. 2 is an exemplary front view of the counterbalancing shaft accommodating structure according to the embodiment of the invention, as viewed from a direction indicated by an arrow II shown in FIG. 1.

As is shown in FIG. 1, a motor vehicle engine 10 is configured to have a cylinder head 11 and a cylinder block 12. An oil pan 14 is, as is shown in FIG. 2, provided at a lower end portion 13 of the cylinder block 12.

In addition, a counterbalancing unit 15 is provided within the oil pan 14 for reducing the vibration of the engine 10.

Figure 3:
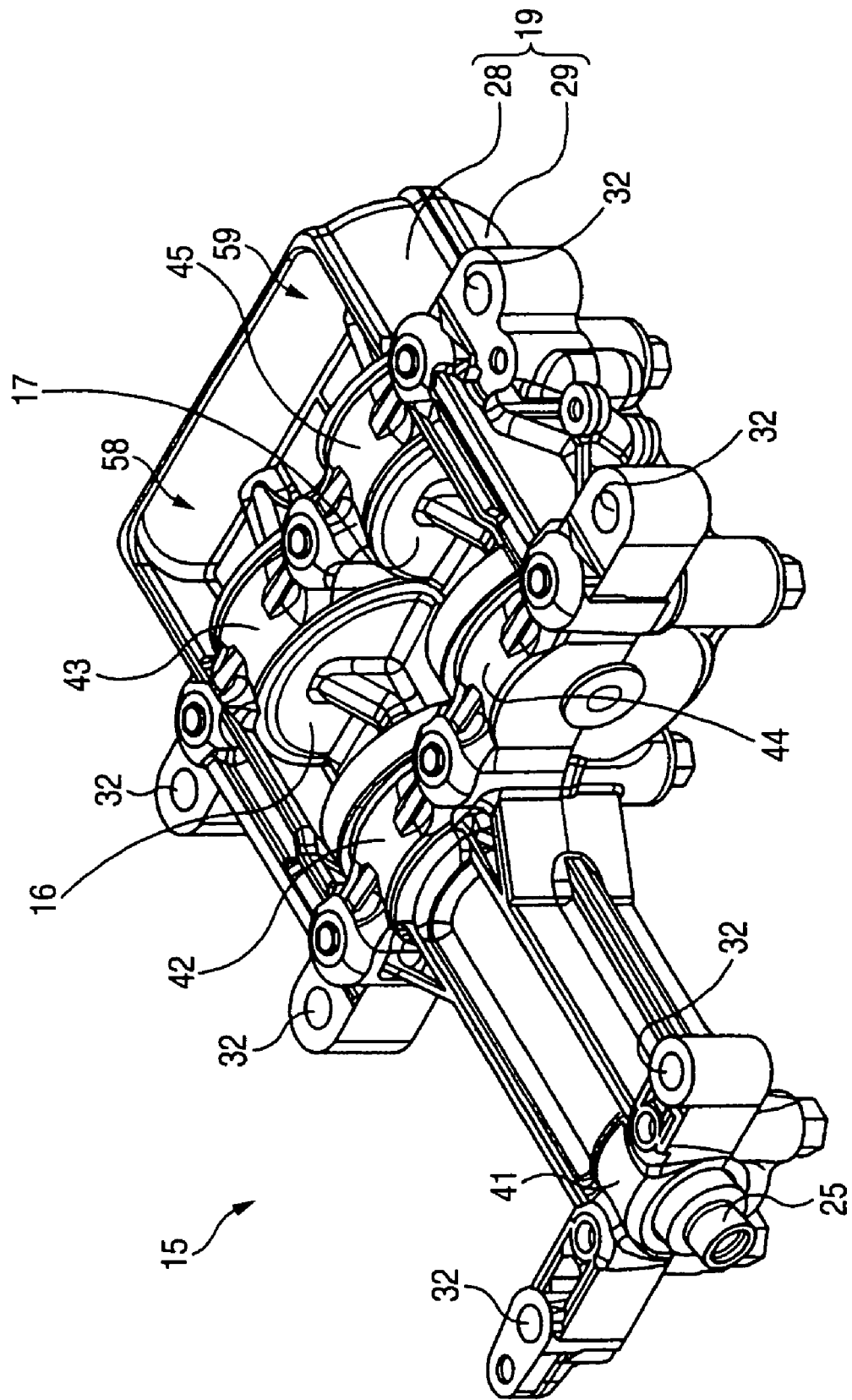
FIG. 3 is an exemplary perspective view as upwardly viewed which shows the overall configuration of the counterbalancing shaft accommodating structure according to the embodiment of the invention.
Figure 4:
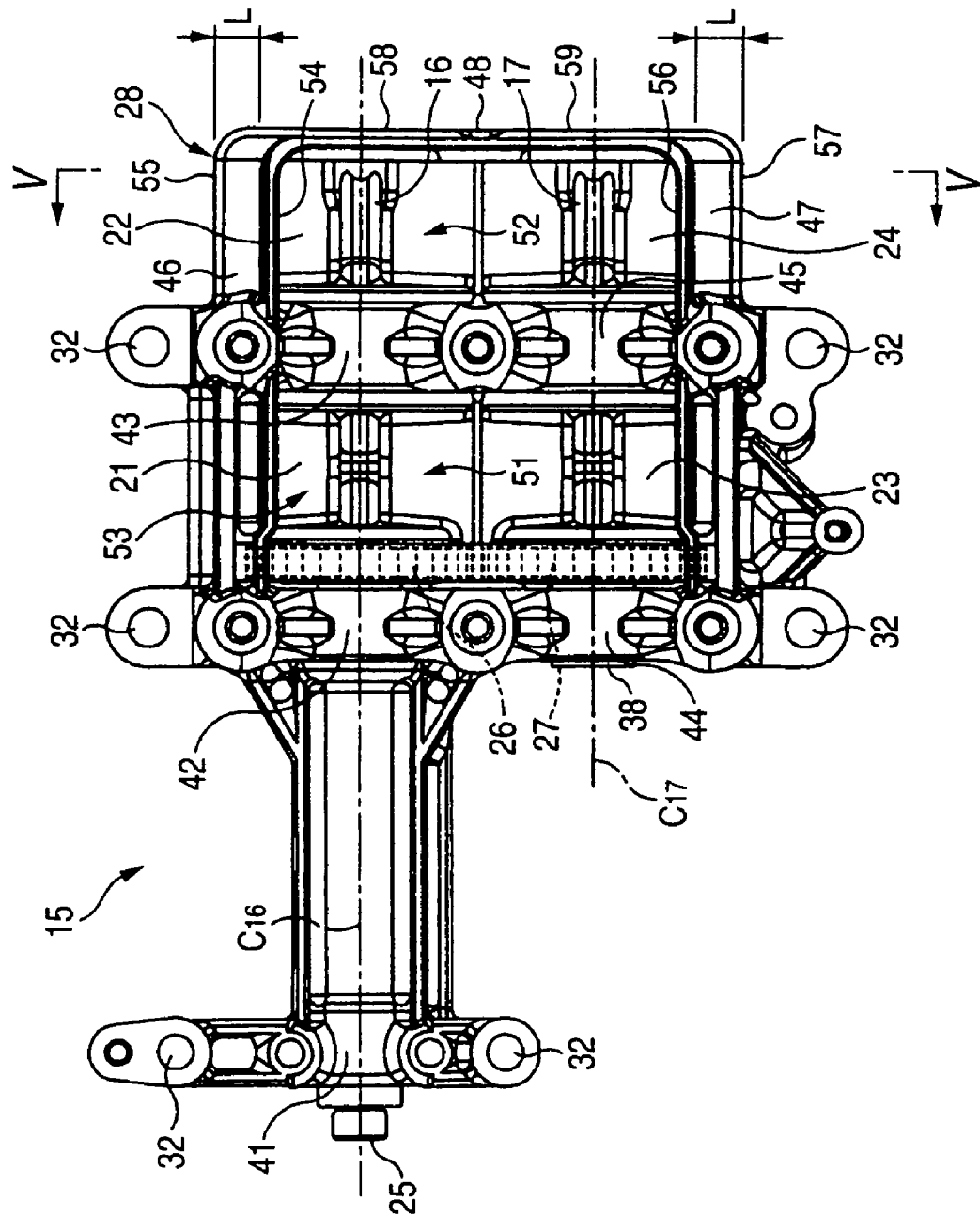
FIG. 4 is an exemplary top view which shows the overall configuration of the counterbalancing shaft accommodating structure according to the embodiment of the invention.

In addition, as is shown in FIGS. 3 and 4, this counterbalancing unit 15 includes a drive-side shaft 16, a driven-side shaft 17 and a housing 19. Note that these drive-side shaft 16 and driven-side shaft 17 are both those called counterbalancing shafts.

A sprocket, not shown, is provided at a front end portion 25 of the drive-side shaft 16, and this sprocket is mechanically connected to a crankshaft (whose illustration is omitted) of the engine 10 via a chain, not shown.

Additionally, a drive gear 26 is provided on the drive-side shaft 16, and a driven gear 27 is provided on the driven-side shaft 17. These drive gear 26 and driven gear 27 mesh with each other, so that the rotation of the drive-side shaft 16 is made to be transmitted to the driven-side shaft 17.

An A balancer weight 21 and a B balancer weight 22 are provided on the drive-side shaft 16.

On the other hand, the driven-side shaft 17 has a length which is shorter than the drive-side shaft 16, and a C balancer weight 23 and a D balancer weight 24 are provided on the driven-side shaft 17.

Figure 5:
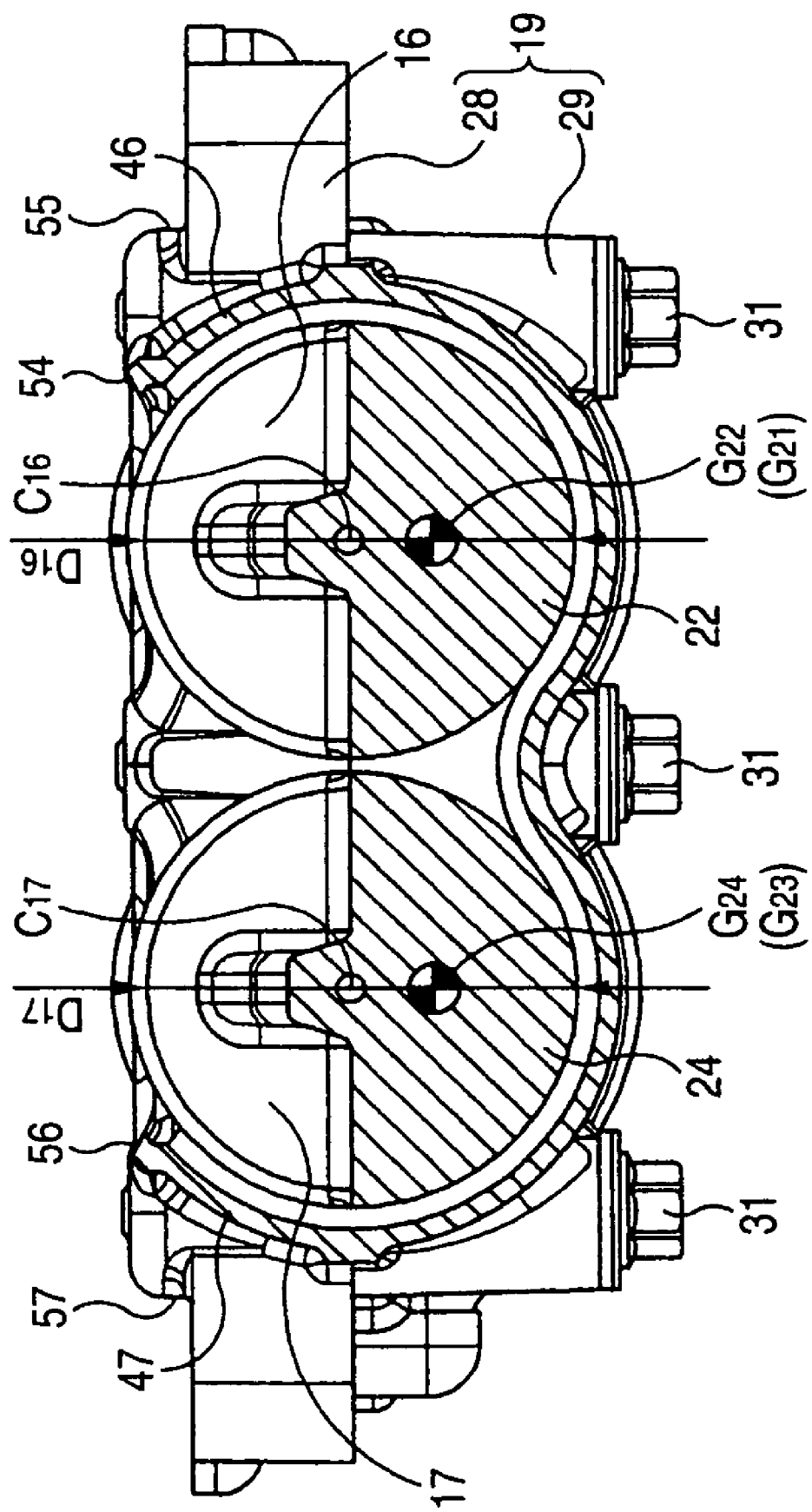
FIG. 5 is an exemplary sectional view of the counterbalancing shaft accommodating structure according to the embodiment of the invention which is sectioned along the line V-V in FIG. 4.

As is shown in FIG. 5, the A balancer weight 21 and the B balancer weight 22 have a substantially semi-circular cross section, and a center of gravity $G_{21}$ of the A balancer weight 21 and a center of gravity $G_{22}$ of the B balancer weight 22 are provided eccentrically with a rotational axis $C_{16}$ of the drive-side shaft 16.

Similarly, the C balancer weight 23 and D balancer weight 24 also have a substantially semi-circular cross section, and a center of gravity $G_{23}$ of the C balancer weight 23 and a center of gravity $G_{24}$ of the D balancer weight 24 are provided eccentrically with a rotational axis $C_{17}$ of the driven-side shaft 17.

The housing 19 includes an upper housing 28 and a lower housing 29, and the upper housing 28 and the lower housing 29 are fastened together with fastening bolts 31.

In addition, fixing bolt holes 32 are formed in the upper housing 28, as is shown in FIG. 4.

Then, although not shown, fixing bolts are passed through these fixing bolt holes 32, whereby the upper housing 28 is fixed to the cylinder block 12 from therebelow with the fixing bolts.

As is shown in FIG. 1, provided on the lower housing 20 are a lower front end drive journal 33, a lower intermediate drive journal 34 and a lower rear end drive journal 35, as well as a lower front end driven journal 36 and a lower rear end driven journal 37. These five journals 33 to 37 all extend in a direction which intersects the rotational axis $C_{16}$ of the drive-side shaft 16 and the rotational axis $C_{17}$ of the driven-side shaft 17 at right angles.

The lower front end drive journal 33 is a bearing which supports rotatably an area of the drive-side shaft 16 which lies near the front end portion 25 from therebelow.

The lower intermediate drive journal 34 is a bearing which supports rotatably an area of the drive-side shaft portion 16 which lies near the A balancer weight 21 between the front end portion 25 and the A balancer weight 21 of the drive-side shaft 16 from therebelow.

The lower rear end drive journal 35 is a bearing which supports rotatably an area of the drive-side shaft 16 which lies between the A balancer weight 21 and the B balancer weight 22 from therebelow.

In addition, the lower front end driven journal 36 is a bearing which supports rotatably an area of the driven-side shaft 17 which lies near the C balancer weight 23 between a front end portion 38 and the C balancer weight 23 from therebelow.

The lower rear end driven journal 37 is a bearing which supports rotatably an area of the driven-side shaft 17 which lies between the C balancer weight 23 and the D balancer weight 24 from therebelow.

On the other hand, as is shown in FIG. 4, provided on the upper housing 28 are an upper front end drive journal 41, an upper intermediate drive journal 42 and an upper rear end drive journal 43 which each extend in a direction which intersects the rotational axis $C_{16}$ of the drive-side shaft 16 at right angles, as well as, an upper front end driven journal 44 and an upper rear-end driven journal 45. Note that all the five journals 41 to 45 provided on the upper housing 28 extend in the direction which intersects the rotational axis $C_{16}$ of the drive-side shaft 16 and the rotational axis $C_{17}$ of the driven-side shaft 17 at right angles.

The upper front end drive journal 41 is a journal which supports rotatably an area of the drive-side shaft 16 which lies near the front end portion 25 from thereabove in a position which confronts the lower front end drive journal 33.

The upper intermediate drive journal 42 is a bearing which supports rotatably an area of the drive-side shaft portion 16 which lies near the A balancer weight 21 between the front end portion 25 and the A balancer weight 21 of the drive-side shaft 16 from thereabove in a position which confronts the lower intermediate drive journal 34.

The upper rear end drive journal 43 is a bearing which supports rotatably an area of the drive-side shaft 16 which lies between the A balancer weight 21 and the B balancer weight 22 from thereabove in a position which confronts the lower rear end drive journal 35.

In addition, the upper front end driven journal 44 is a bearing which supports rotatably an area of the driven-side shaft 17 which lies near the C balancer weight 23 between the front end portion 38 and the C balancer weight 23 from thereabove in a position which confronts the lower front end driven journal 36.

The upper rear end driven journal 45 is a bearing which supports rotatably an area of the driven-side shaft 17 which lies between the C balancer weight 23 and the D balancer weight 24 from thereabove in a position which confronts the lower rear end driven journal 37.

In addition, as is shown in FIG. 4, an opening 53 is formed in an upper surface of the upper housing 28.

The opening 53 is an opening which expands continuously over both the rotational axis $C_{16}$ of the drive-side shaft 16 and the rotational axis $C_{17}$ of the driven-side shaft 17 and is made to discharge oil that has flowed into an interior of the housing 19 for atomization.

In addition, the opening 53 is partitioned into a first area 51 and a second area 52 by the upper rear end drive journal 43 and the upper rear end driven journal 45.

The first area 51 of the opening 53 is formed into a quadrangle above the A balancer weight 21 and the C balancer weight 23.

The second area 52 of the opening 53 is formed into a quadrangle above the B balancer weight 22 and the D balancer weight 24.

Consequently, oil is discharged from the interior of the housing 19 through the first area 51 of the opening 53 in association with the rotation of the A balancer weight 21 and the C balancer weight 23, and oil is discharged from the interior of the housing 19 through the second area 52 of the opening 53 in association with the rotation of the B balancer weight 22 and the D balancer weight 24.

In addition, as viewed from the top, that is, in a condition shown in FIG. 4, one edge portion 54 of the opening 53 is offset further inwards towards a center of the housing 19 by a predetermined distance L than one edge portion 55 of the housing 19, and the other edge portion 56 of the opening 53 is offset further inwards towards the center of the housing 19 by the predetermined distance L than the other edge portion 57 of the housing 19.

In addition, as is shown in FIG. 5, both the edge portions 54, 56 of the opening 53 are substantially equal in height to an upper end of an outermost rotational locus $D_{16}$ of the drive-side shaft 16 and an upper end of an outermost rotational locus $D_{17}$ of the driven-side shaft 17.

Additionally, the upper surface of the upper surface of the upper housing 28 is formed substantially flat.

As is shown in FIG. 5, the upper housing 28 has side wall portions 46, 47 which are each formed curvedly in such a manner as to follow the outermost rotational locus $D_{16}$ of the drive-side shaft 16 and the outermost rotational locus $D_{17}$ of the driven-side shaft 17.

In addition, as is shown in FIG. 2, an upper end portion of the upper housing 28 is provided further upwards than the lower end portion 13 of the cylinder block 12.

A drive-side shaft working hole 58 and a driven-side shaft working hole 59 are opened in a rear wall portion 48 of the counterbalancing unit 15 which includes a rear wall portion 48A of the upper housing 28 and a rear wall portion 48B of the lower housing 29. These drive-side shaft working hole 58 and driven-side shaft working hole 59 are formed in such a manner as to communicate with each other.

In addition, by providing the drive-side shaft working hole 58 and the driven-side shaft working hole 59, the working mechanic is allowed to carry out maintenance work on the drive-side shaft 16 and the driven-side shaft 17 through the drive-side shaft working hole 58 and the driven-side shaft working hole 59 without removing the counterbalancing unit 25 from the engine 10.

Note that a rib can be formed on the lower housing 29 in such a manner as to extend in parallel with the rotational axis $C_{16}$ of the drive-side shaft and the rotational axis $C_{17}$ of the driven-side shaft 17. By forming the rib in that way, the rigidity of the lower housing 29 can be increased further.

Since the counterbalancing shaft accommodating structure according to the embodiment of the invention is configured as has been described heretofore, the following functions and advantages will be provided.

As is shown in FIG. 2, since the counterbalancing unit 15 is provided in such a manner that the upper end portion of the upper housing 28 is positioned further upwards than the lower end portion 13 of the engine 10, a relatively long distance between the opening 53, the drive-shaft side working hole 58 and the driven-side shaft working hole 59 and oil in the oil pan 14 can be secured, whereby it is made hard for oil to flow into the interior of the housing 19. In addition, by locating the counterbalancing unit 15 in the upper position which is higher than those in the related-art structures, the height of the engine 10 can be suppressed.

In addition, as is shown in FIG. 4, since the opening 53 which is formed in the upper housing 28 is formed as the opening which expands continuously over both the rotational axes $C_{16}$, $C_{17}$ of the counterbalancing shafts 16, 17, oil that has flowed into the interior of the housing 19 can be discharged from the interior of the housing 19 in a promoted fashion, thereby making it possible to prevent the occurrence of a situation in which oil continues to be stirred within the housing 19.

Consequently, the counterbalancing shaft accommodating structure of the invention can contribute to the reduction in size of the engine 10 while preventing the aeration of oil and suppressing the torque loss of the engine 10.

In addition, by forming the one edge portion 54 of the opening 53 in such a manner as to be substantially equal in height to the upper end of the outermost rotational locus $D_{16}$ of the drive-side shaft 16, the enlargement of the engine 10 can be prevented while allowing the oil in the housing 19 to be discharged with good efficiency.

In addition, as is shown in FIG. 4, since the one edge portion 54 of the opening 53 is formed in such a manner as to be offset further inwards towards the center of the housing 19 by the predetermined distance L than the one edge portion 55 of the housing and the other edge portion 56 of the opening 53 is formed in such a manner as to be offset further inwards towards the center of the housing 19 by the predetermined distance L the other edge portion of the housing 19, the flow of oil into the interior of the housing 19 from the sides of the housing 19 can be prevented.

Additionally, as is shown in FIG. 5, the side wall portion 46 is provided on the housing 19 which is formed curvedly in such a manner as to follow the outermost rotational locus $D_{16}$ of the drive-side shaft 16 and the side wall portion 47 is also formed thereon which is formed curvedly in such a manner as to follow the outermost rotational locus $D_{17}$ of the driven-side shaft 17. Consequently, while preventing the enlargement of the housing 19, the opening 53 can be prevented from being expanded too largely, so as to prevent the flow of oil into the interior of the housing 19.

In addition, since the opening 53 is partitioned into the first area 51 and the second area 52 by the upper rear end drive journal 43 and the upper rear end driven journal 45, the reduction in rigidity of the housing 19 can be suppressed.

Additionally, the A balancer weight 21 and the C balancer weight 23 which are provided below the first area 51 and the B balancer weight 22 and the D balancer weight 24 which are provided below the second area 52 are, as is shown in FIG. 5, each formed to have the substantially semi-circular cross section, and the oil in the housing 19 can be discharged to the outside of the housing 19 through the first area 51 and the second area 52 by the rotation of the C balancer weight 23 and the D balancer weight 24.

Then, with the first area 51 and the second area 52 of the opening 53 which contribute largely to the discharge of oil from the interior of the housing 19 kept open, the rigidity of the housing 19 is attempted to be increased by the upper rear end drive journal 43 and the upper rear end driven journal 45.

Namely, the area of the drive-side shaft 16 which is supported by the upper rear end drive journal 43 and the area of the driven-side shaft 17 which is supported by the upper rear end driven journal 45 are each formed into a substantially true circle, the contribution thereof to the discharge of oil in the housing 19 is relatively low. Because of this, even though the portions of the opening 53 which contribute less to the discharge of oil are covered in a restricted fashion, the covering of the areas in question does not interrupt the discharge of oil from the interior of the housing 19.

In addition, as is shown in FIG. 5, since the upper surface of the upper housing 28 is formed substantially flat, a distance to a bottom portion 14A of the oil pan 14 can be secured largely when the counterbalancing unit 15 is fixed to the cylinder block 12 of the engine 10. Consequently, the suppression of an oil flow into the interior of the housing 19 can be enabled.

Thus, while the embodiment of the invention has been described heretofore, the invention is not such as to be limited to the embodiment and hence, in carrying out the invention, the invention can be changed or modified variously without departing from the spirit and scope thereof.

What is claimed is:

1. A counterbalancing shaft accommodating structure, comprising:
   a pair of counterbalancing shafts, provided in an oil pan attached to a lower end portion of an engine; and
   a housing, adapted to accommodate the counterbalancing shafts in the oil pan, and comprising an upper housing and a lower housing, and
   an upper-side journal portion and a lower-side journal portion, extending in a direction, which intersects both rotational axes of the counterbalancing shafts at right angles, in the housing, respectively, the upper-side journal portion that supports rotatably the counterbalancing shafts thereabove, the lower-side journal portion that supports rotatably the counterbalancing shafts therebelow, wherein
   an upper end portion of the upper housing is provided further upwards than the lower end portion of the engine,
   an opening is formed continuously to expand over both rotational axes of the pair of counterbalancing shafts in an upper surface of the upper housing, the opening is partitioned into at least two areas by the upper-side journal portion, the pair of counterbalancing shafts are provided with a first balancer weight and a second balancer weight, and the upper-side journal portion and the lower-side journal portion support the counterbalancing shafts between the first balancer weight and the second balancer weight.

2. The counterbalancing shaft accommodating structure as set forth in claim 1, wherein edge portions of the opening are substantially equal in height to upper ends of outermost rotational loci of the counterbalancing shafts.

3. The counterbalancing shaft accommodating structure as set forth in claim 2, wherein edge portions of the opening are offset further inwards towards a center of the housing than side edge portions of the housing, respectively.

4. The counterbalancing shaft accommodating structure as set forth in claim 2, wherein the housing has side wall portions which are formed curvedly in such a manner as to follow outermost rotational loci of the counterbalancing shafts.

5. The counterbalancing shaft accommodating structure as set forth in claim 1, wherein edge portions of the opening are offset further inwards towards a center of the housing than side edge portions of the housing, respectively.

6. The counterbalancing shaft accommodating structure as set forth in claim 5, wherein the housing has side wall portions which are formed curvedly in such a manner as to follow outermost rotational loci of the counterbalancing shafts.

7. The counterbalancing shaft accommodating structure as set forth in claim 1, wherein the housing has side wall portions which are formed curvedly in such a manner as to follow outermost rotational loci of the counterbalancing shafts.

* * * * *